UNITED STATES PATENT OFFICE.

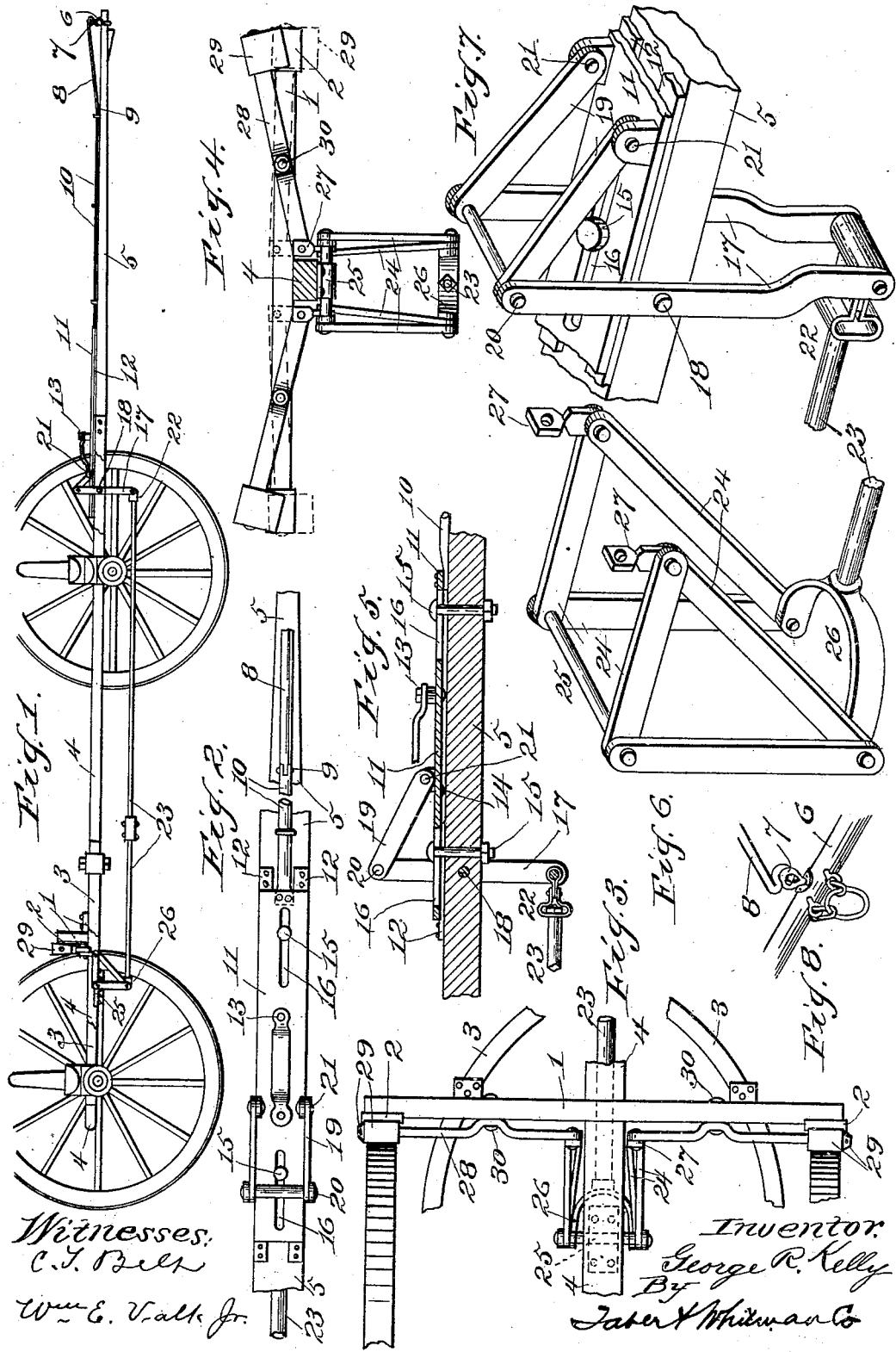

GEORGE R. KELLY, OF CHRYSTAL, PENNSYLVANIA.

AUTOMATIC VEHICLE-BRAKE.

No. 931,621.  Specification of Letters Patent.  Patented Aug. 17, 1909.

Application filed March 18, 1909. Serial No. 484,204.

*To all whom it may concern:*

Be it known that I, GEORGE R. KELLY, a citizen of the United States, residing at Chrystal, in the county of Potter and State of Pennsylvania, have invented certain new and useful Improvements in Automatic Vehicle-Brakes, of which the following is a specification.

This invention relates to vehicle brakes, and pertains especially to wagon brakes and means for operating the same from the wagon tongue and yoke.

The object of the invention is to provide an automatic mechanism adapted to be operated by and from a neck yoke when the latter is retracted or given rearward movement under hold-back of the draft horses and thereby operates a pair of brake levers having brake shoes thereon and operated perpendicular across the wagon tongue.

A further object of the invention is to provide novel and peculiar mechanism for hanging and operating brake levers perpendicular to and lengthwise a brake beam to which said levers are fulcrumed, and to furnish special means for connecting and operating said mechanism from the tongue and yoke of the wagon.

A still further object of the invention is to provide a pair of brake levers having brake shoes thereon and fulcrumed to a fixed brake beam, and means for swinging the brake levers vertically between the rear wheels of a wagon and the brake beam by mechanism operated from the wagon tongue by the draft horses.

A still further object of the invention is to provide certain mechanism mounted on the front part of a wagon and connected to a neck yoke, and certain mechanism hung from the rear of the wagon and connected with the front mechanism for swinging brake-shoes at right angles to the wagon tongue and reach pole simultaneously with the hold-back action of the wagon so as to automatically brake the wagon.

Other objects, advantages and improved results may be obtained in the practical application of the invention.

As far as known to applicant this class of brakes has been operated to slide the shoes, or to be pushed or pulled against the wheels to brake the wagon, and in some cases the brake-shoes have been pivoted on the ends of an arm which is pivoted to a brake lever fulcrumed to a fixed brake beam, but such constructions and arrangements do not afford a wedging movement of the brake-shoes between a fixed brake beam which forms a bearing for one side of the shoes and a wheel tire against which the other side of the shoes wedge; nor is the mechanism for producing such wedging action of the shoes automatically with the hold-back of a wagon, such as will be hereinafter described and claimed.

That the invention may be differentiated from others of this class it may be said briefly to consist in automatically swinging the brake beams crosswise and wedging the brake-shoes between a fixed brake beam and the wagon wheels from mechanism carried by the wagon tongue and operated by the draft horses.

In the accompanying drawings forming part of this application: Figure 1 is a side elevation of a wagon with the near wheels removed, the tongue partly broken away, and showing the application of the invention. Fig. 2 is a detail top view of the front or tongue mechanism. Fig. 3 is a similar view of the rear mechanism. Fig. 4 is an end view of the rear mechanism showing movable position of the brake-shoes in dotted lines. Fig. 5 is a detail sectional view of part of the tongue and slidable plate. Fig. 6 is a perspective view of the rear hanger. Fig. 7 is a similar view of the front hanger showing part of the slidable plate. Fig. 8 is a detail perspective view of the neck-yoke connection with the tongue.

The same reference numerals denote the same parts throughout the several views of the drawings.

A brake beam 1 is provided with friction plates 2, and is fixed upon the rear hounds 3, crosswise the latter and at right-angles to the coupling pole 4 and tongue 5 of a wagon having a suitable neck yoke 6, provided with a central eye 7. The eye 7 is engaged by a hook-rod 8, pivoted at 9 to one end of a rod 10, the other end thereof being attached to a plate 11, working on a pair of runners 12 fixed to the top of the tongue with a space between the runners for the head of a bolt 13 and its fastening bolt 14, during the sliding movement of the plate 11, and for the passage of the bolts 15 which extend through slots 16 in the plate and through the tongue to slidably hold the plate thereto.

The front hanger consists of a pair of bars 17 fulcrumed at 18, and a pair of arms 19 pivoted to the said bars at 20 and to the plate 11 at 21. The lower end of the bar 17 is provided with a swivel connection 22, to which is attached one end of a connecting rod 23. The swivel connection permits of a double pivot movement of the rod, *i. e.* a vertical movement and a lateral movement, and also pivotally connects the hanger with the rod 23, so that the operation of the tongue, the plate 11 and the hanger may not be interfered with.

The rear hanger consists of a series of bars 24 arranged in triangular shape and suitably secured together. This hanger is pivotally hung from the rear of the coupling-pole 4, at 25, and its lower end has a coupling 26 pivoted thereto and to which the rear end of the connecting rod 23 is secured. A link 27 is pivoted to each side of the upper forward end of this hanger. Brake levers 28 have one end pivoted to the links 27 and the other end is provided with wedged-shaped shoes or blocks 29. The levers 28 are fulcrumed to the brake beam 1 at 30. The links 27 permit a free swing of the levers 28 lengthwise the brake beam, and also affords means whereby the hanger may be swung perpendicular to the levers 28.

It is obvious that a pull-back on the part of the horses will simultaneously slide the plate 11 and work the front hanger which automatically works the rear hanger through the connecting rod 23, to wedge the shoes between the wheel tires and the friction plates 2 carried by the brake-beam.

It will be understood that various mechanical changes may be made in the actual construction and arrangement of the device and in the several parts thereof, without departing from the spirit of the invention.

Having thus described my invention what I claim as new and desire to secure by Letters Patent is:

1. The combination, with a fixed brake beam, a slidable tongue plate, and a front hanger pivoted to the plate, of a pivoted rear hanger connected with the front hanger, and brake levers having shoes thereon and pivoted to the rear hanger and fulcrumed to the brake beam for swinging lengthwise the said beam.

2. The combination, with a stationary brake beam, and a rear hanger, of brake levers pivoted to the hanger and fulcrumed to swing lengthwise the beam, a front hanger connected with the rear hanger, and means carried by the tongue and connected with the front hanger for operating the hangers.

3. The combination, with a stationary brake beam, brake levers fulcrumed to the beam so as to swing lengthwise the latter, and wedged-shaped brake-shoes fixed to the levers, of a pivoted rear hanger to which the levers are pivoted, a slidable tongue plate, a fulcrumed front hanger pivoted to the plate, and means connecting the hangers for operating them and the brake levers automatically with the sliding of the plate.

In testimony whereof I affix my signature in presence of two witnesses.

GEORGE R. KELLY.

Witnesses:
  I. K. SLOAT,
  CHARLES PAYNE.